April 19, 1932.  J. O. BOVING  1,854,778
REVERSIBLE ABSORPTION OR ADSORPTION REFRIGERATING APPARATUS
Filed June 18, 1930  2 Sheets-Sheet 1

INVENTOR
JENS ORTEN BOVING
BY Ruege, Boyce & Babcock
ATTORNEYS

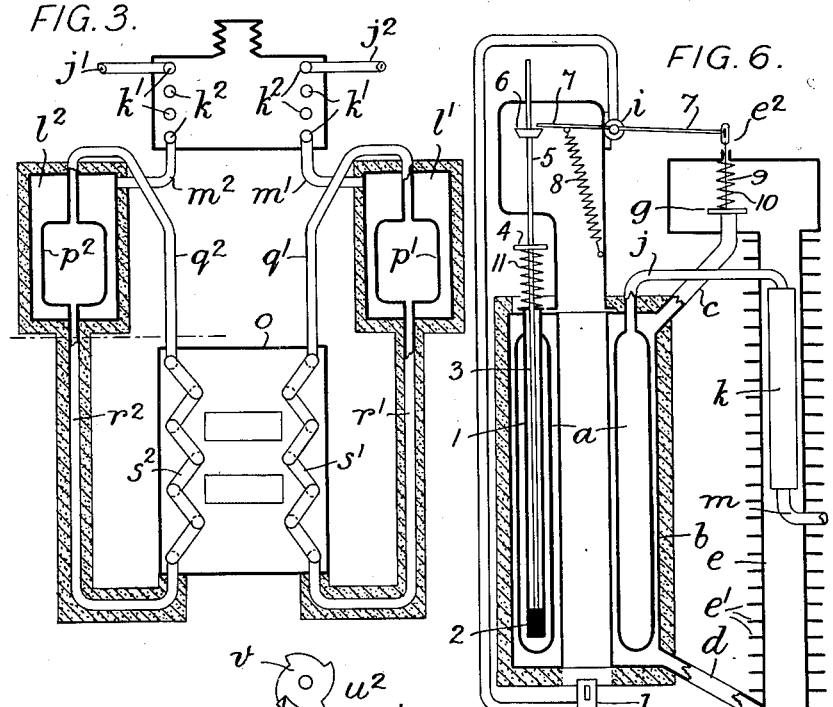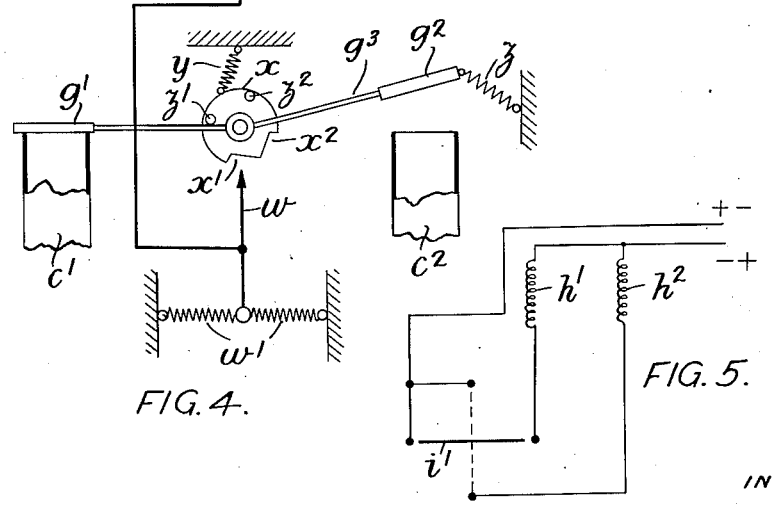

Patented Apr. 19, 1932

1,854,778

UNITED STATES PATENT OFFICE

JENS ORTEN BOVING, OF WESTMINSTER, LONDON, ENGLAND

REVERSIBLE ABSORPTION OR ADSORPTION REFRIGERATING APPARATUS

Application filed June 18, 1930, Serial No. 461,973, and in Great Britain August 13, 1929.

This invention relates to intermittent reversible absorption or adsorption refrigerating apparatus, preferably of the kind which employs a solid absorption material, such as calcium chloride or a similar salt, or an adsorption material such as charcoal or silica gel or the like, whilst the refrigerant may be ammonia or other amine, or a haloid salt absorbing sulphur dioxide, or a hydroxide absorbing alcohol. The invention is also applicable to the ordinary wet absorption refrigerating system, using for example water and ammonia. The invention may also be applied to the kind of reversible refrigerating apparatus in which two generators are provided working in opposite phase and heated and cooled by heat interchange with a fluid.

The main feature of the invention consists in the generator or generators being permanently immersed in a fluid which is localized around the generator and the heat applied therethrough to the generator during the heating phase, but which during the re-absorption or re-adsorption phase circulates through a cooler.

The fluid employed conveniently may be water, and for effective heating and cooling the fluid is preferably constantly a liquid. However, during the heating phase the fluid may be permitted to assume the vaporous condition, i. e. steam in the case of water.

With a duplex machine having two generators working in opposite phase, the cooler may be common to the fluid jackets of both generators, the flow between each jacket and the cooler being alternately interrupted.

The fluid jacket or jackets communicate at the top and bottom with the cooler and by merely interrupting the communication at the top, convectional circulation of the fluid is localized in the jacket or respective jacket without interrupting communication at the bottom, whereas on the communication at the top being reestablished, thermosiphonic circulation up through the jacket and down through the cooler can take place.

The fluid jacket is preferably narrow in order to restrict the quantity of fluid to be initially cooled on change of phase and hence the loss due thereto. Also the generator is preferably annular with an annular jacket, centrally heated to set up localized convection during the heating phase.

The cooler is preferably air cooled.

Representative examples of refrigerating apparatus according to the invention, are illustrated diagrammatically on the accompanying drawings, in which:—

Fig. 3 is a sectional elevation showing the evaporators therefor.

Fig. 4 is a diagrammatic view of a trip gear for operating the valves of an apparatus having duplex generators.

Fig. 5 is a diagram of the heating circuits.

Fig. 6 is a diagrammatic sectional elevation of a modification.

Figure 1:
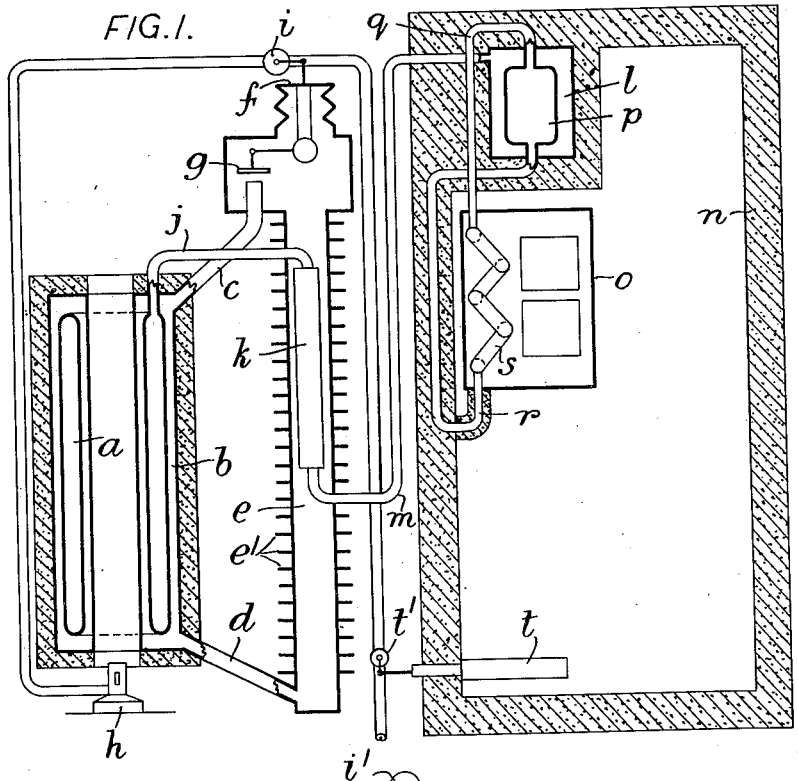
Fig. 1 is a diagrammatic sectional elevation of an apparatus having a single generator.

Referring more particularly to Fig. 1, $a$ is a generator of an absorption refrigerating apparatus. This generator $a$ is of annular cylindrical configuration with the axis upright, and contains a solid absorption medium, such as calcium chloride.

The generator $a$ is located in an upright annular cylindrical jacket $b$ closely surrounding the walls of the generator $a$ with but narrow intervening spaces. The jacket $b$ communicates at the top by an upwardly inclined pipe $c$ and at the bottom by a downwardly inclined pipe $d$ with the top and bottom respectively of a cooler $e$. The cooler $e$ is provided externally with fins $e^1$ for the conduction and radiation of heat to the atmosphere.

The jacket $b$, pipes $c$ and $d$, and the cooler $e$ are filled with water and are entirely closed. The top of the cooler $e$ however has an expansible bellows $f$.

$g$ is a valve which when the bellows $f$ is contracted closes the top of the pipe $c$.

$h$ is a gas burner located beneath the central flue space of the annular jacket $b$.

During the driving-off phase of operation of the refrigerating apparatus, the flame of the burner $h$ heats the water in the jacket $b$, and owing to closure of the pipe $c$ by the valve $g$ the water can only circulate by convection within the jacket and cannot circulate through the cooler $e$, and the heating effect is thus localized around the generator $a$.

The heat from the flame of the gas burner $h$ is communicated through the water in the jacket $b$ to the generator $a$ and drives off refrigerant, for instance ammonia, previously absorbed in the solid absorbent therein.

Eventually, after heating has been proceeding for a period, the pressure in the water in the jacket $b$, pipes $c$ and $d$, and cooler $e$, which pressure will correspond to the vapour pressure of the hot water in the jacket $b$ plus the expansion which has taken place of the water, causes the bellows $f$ to expand. By means of a trip gear which will be described later, the expanded bellows $f$ opens the valve $g$ and also closes a gas valve $i$ to reduce or cut off the supply of gas to the burner $h$.

Communication between the pipe $c$ and the top of the cooler $e$ is thus re-established, and the water can circulate thermosiphonically down through the cooler $e$ wherein it is cooled, and up through the jacket $b$ where it cools the generator $a$ and the solid absorbent therein, thereby initiating and effecting the re-absorption of refrigerant.

Figure 2:
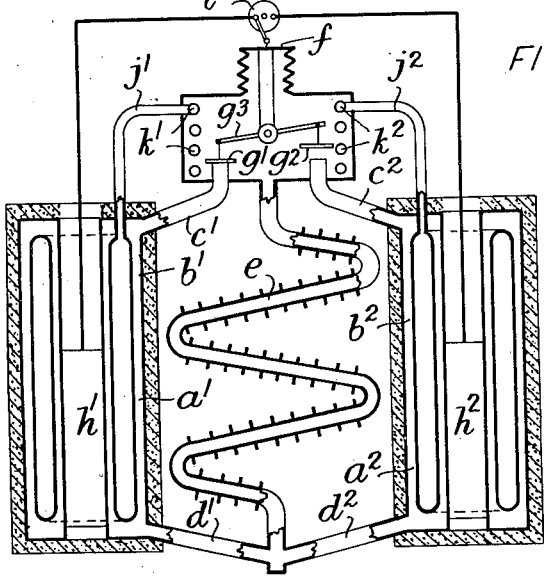
Fig. 2 is a diagrammatic sectional elevation of duplex generators.

The method of heating a generator of a refrigerating apparatus through a liquid the circulation of which is localized in a jacket surrounding the generator, by interrupting the flow of the liquid to a cooler, and cooling the generator by re-establishing the flow through the cooler, can be applied to an apparatus having duplex generators working in opposite phase. The generators of such a duplex apparatus are shown in Fig. 2, wherein $a^1$ is one generator and $a^2$ the other generator. $b^1$, $b^2$ are the jackets connected at the top by pipes $c^1$, $c^2$ and at the bottom by pipes $d^1$, $d^2$ to a cooler $e$ in common.

The pipe $c^1$ of the jacket $b^1$ is arranged to be closed by a valve $g^1$ and the pipe $c^2$ of jacket $b^2$ is arranged to be closed by a valve $g^2$. The valves $g^1$, $g^2$ are mounted on a rocking lever $g^3$ and, through trip gear which will be subsequently described, the bellows $f$ at each expansion rocks the lever $g^3$ alternately in one or the other direction to open the one valve $g^1$ or $g^2$ and close the other valve $g^2$ or $g^1$, to restore the flow of water from the jacket $b^1$ or $b^2$ which has just been heated and interrupt the flow of water from the jacket $b^2$ or $b^1$ about to be heated.

At the same time the trip gear, by a switch $i^1$, closes the circuit of an electric heater $h^1$ or $h^2$ for heating the jacket $b^1$ or $b^2$ the valve $g^1$ or $g^2$ of which is closed, and opens the circuit of an electric heater $h^2$ or $h^1$ of the jacket $b^2$ or $b^1$ the valve $g^2$ or $g^1$ of which is opened.

Fig. 2 shows the pipe $c^1$ closed by the valve $g^1$ and the pipe $b^2$ opened by the valve $g^2$, and the switch $i$ indicated in a position to close the circuit through the heater $h^1$ and open the circuit through the heater $h^2$.

Referring again to Fig. 1, the refrigerant vapour which is driven off from the solid absorbent when the generator $a$ is heated, passes by a pipe $j$ into the top of a condenser $k$. The condenser $k$ is located in the cooler $e$ so that the water therein also serves for cooling the condenser $k$.

The condenser $k$ is located beneath the level of an evaporator $l$ and the bottom of the condenser $k$ is connected to the top of the evaporator $l$ by an upwardly extending pipe $m$, so that the condensed refrigerant instead of draining into the evaporator $l$ is forced up the pipe $m$ into the evaporator $l$ by the pressure developed in the generator $a$. This is rendered possible by the generator $a$, condenser $k$ and evaporator $l$ being void of air before being charged with refrigerant.

To prevent heating the refrigerator $n$ by the relatively warm condensed refrigerant, the evaporator $l$ into which the condensed refrigerant passes is heat insulated from the usual brine tank $o$ or refrigerator safe $n$ and solely indirectly thermally connected thereto by a secondary evaporator and condenser system, as follows:—

The evaporator $l$ is a heat-insulated chamber in heat-exchange proximity with a chamber $p$ communicating at the top by a pipe $q$ and at the bottom by a pipe $r$ with a coil $s$ located beneath the level of the chamber $p$ and in the brine tank $o$ and forming a closed circuit. Liquid ammonia or other readily vaporizable liquid partially fills the coil-connected chamber $p$ from which air has been exhausted. On evaporation of the liquid refrigerant in the evaporator $l$, the vapour of the ammonia or the like in the closed-circuit coil-connected chamber $p$ condenses, and owing to the thus produced reduction in the vapour pressure in the closed circuit $p$, $q$, $r$, $s$, the ammonia or the like in the coil $s$ boils, cooling the brine or refrigerator. During the opposite phase when warm refrigerant is flowing into the evaporator $l$, no transfer of heat to the coil $s$ occurs, as the chamber $p$ connected thereto and which becomes warmed, is located at a higher level than the coil $s$.

The refrigerator safe $n$ may contain a thermostat $t$ which controls the setting of a valve or switch $t^1$ regulating the supply of gas or electricity to the burner $h$ or burners or electric heater or heaters $h^1$, $h^2$. This is additional to the periodic switching of the heating effected by the pressure of the water through which heating is effected and operated by the above-mentioned trip gear.

In the duplex apparatus illustrated in Figs. 2 and 3, refrigerant vapour driven off from the generator $a^1$ passes by a pipe $j^1$ into the top of a condenser $k^1$, constituted by a coil located in the upper portion of the cooler $e$.

From the condenser coil $k^1$ the condensed refrigerant flows by a pipe $m^1$ into an evaporator $l^1$. The evaporator $l^1$ is in heat-exchange proximity with a chamber $p^1$ communicating at the top by a pipe $q^1$ and at the bottom by a pipe $r^1$ with a coil $s^1$, constituting a closed circuit containing readily vaporizable liquid, as described in connection with Fig. 1.

Similarly, the other generator $a^2$ is connected by a pipe $j^2$ to a coil condenser $k^2$, which is connected by a pipe $m^2$ to an evaporator $l^2$. Likewise the evaporator $l^2$ is in heat exchange proximity with a chamber $p^2$ connected by pipes $q^2$ and $r^2$ to a coil $s^2$ and constituting a closed circuit containing readily vaporizable liquid.

The trip gear for operating the valves $g^1$, $g^2$ and the switch $h^1$, is for instance arranged as illustrated diagrammatically in Fig. 4, as follows:—

To the bellows $f$ is connected a pawl $u$ laterally drawn by a spring $u^1$ against a stop $u^2$, and which pawl $u$ engages a four toothed ratchet wheel $v$ of the standard quarter turn switch $i^1$ (Figs. 2 and 5). This switch $i^1$ alternatively places one or the other of the electric heaters $h^1$ or $h^2$ of the two generators $a^1$, $a^2$ in circuit. The switch $i^1$ snaps over at the end of the expansion stroke of the bellows $f$.

Alternatively, for gas heating, the pawl $u$ actuates a two-way gas cock to supply gas to one and the other burner for the generators $a^1$, $a^2$.

Within the water space, there is another pawl $w$ which is centered by springs $w^1$ and is connected to the bellows $f$. This spring-centered pawl $w$ engages in one or the other of two alternative notches $x^1$, $x^2$ in a rocking disc $x$, pressed by a spring $y$ to set itself on one or the other side of a dead-centre. The rocking lever $g^3$ on which the valves $g^1$, $g^2$ for opening and closing the communications between the water jackets $b^1$, $b^2$ and the cooler $c$ are mounted, is coaxially pivoted with the rocking disc $x$. Two studs $z^1$, $z^2$ are provided one on each side of the axis of the rocking disc $x$, one or the other of these studs $z^1$, $z^2$ alternatively eventually bears against the respective arm of the rocking lever $g^3$ to rock the lever $g^3$ to close the respective valve $g^1$ or $g^2$ against its seating and open the other valve $g^2$ or $g^1$. The rocking valve lever $g^3$ is normally held in its end positions by a dead centre spring $z$.

With a single generator $a$ as illustrated in Fig. 1, the trip can be arranged mainly as above described, but merely closes the gas valve $h$ or opens a switch, and opens the valve $g$ re-establishing communication with the cooler $e$, and is re-set by hand.

In the examples of apparatus described above, the cooler $e$ and the jacket $b$ or jackets $b^1$ and $b^2$ form an entirely closed system without communication with the atmosphere. Consequently on the jacket $b$ or either of the jackets $b^1$ or $b^2$ being heated, the pressure set up in the system precludes the water in the respective jacket boiling and forming steam.

However, if the cooler $e$ is in free communication with the atmosphere or if otherwise a pressure cannot develop therein, on heating the stagnant water in the jacket $b$, $b^1$ or $b^2$ steam will be generated in the jacket and water will be depressed therefrom and driven into the cooler $e$. Further heating of the generator $a$, $a^1$ or $a^2$ will then be effected through the steam confined in the jacket. A modification of the apparatus operating in this manner with steam heating of the generator is illustrated in Fig. 6.

In Fig. 6 the parts are as already described in connection with Fig. 1, except that the top of the cooler $e$ is in communication with the atmosphere by a vent $e^2$, and that the valve $g$ is opened and the gas valve $i$ is closed by a temperature-controlled trip gear which is set by hand.

This trip gear is of known construction and consists of a tubular pocket 1 extending downwards into the generator $a$ and contains a mass of readily fusible metal 2, on which rests a rod 3, having at its upper end a head 4. A rod 5 with a collar 6 rests on the head 4 of the rod 3. The collar 6 of the rod 5 supports one end of a lever 7 against the influence of a spring 8, which tends to displace the lever 7 angularly. The lever 7 turns about the axis of and is fast with the plug of a gas cock constituting the gas valve $i$. The other end of the lever 7 is connected by a slotted connection to the stem 9 of the valve $g$. 10 is a spring which tends to depress the valve $g$.

On the trip being set as shown to close the upper end of the pipe $c$ by means of the valve $g$, in which position the gas cock $i$ is open, the water in the jacket $b$ is heated by the flame of the burner $h$. As the water cannot circulate up the closed pipe $c$ and as pressure cannot develop in the cooler $e$ owing to the vent $e^2$, the water in the jacket $b$ will eventually boil and steam will accumulate in the jacket and depress water therefrom down the pipe $d$ into the cooler $e$. Continued heating of the generator $a$ will then take place through the medium of the steam in the jacket $b$.

The fusion temperature of the metal 2 in the tubular pocket 1 is arranged to be such that fusion occurs on the increase of temperature in the generator $a$ which arises when approximately all the refrigerant has been driven off from the generator $a$. The rod 3 can then be depressed by the spring 8, acting on the lever 7 and through the collar 6 and rod 5. The lever 7 then escapes past the collar 6 and turns the plug of the gas cock $i$ to cut off gas to the burner $h$ and also overpowers the spring 10 and opens the valve g. The steam from the jacket b then passes up the opened pipe c into the cooler, where it condenses, and water from the cooler e passes up the pipe d into the jacket b cooling same and eventually circulates through the pipe c back to the cooler.

11 is a spring beneath the head 4 of the rod 3, which raises the rod 3 out of the fused metal 2, and thus prevents it from being congealed therein when the metal 2 again solidifies on cooling.

The trip is re-set by hand into the position illustrated in Fig. 6.

I claim:

1. In a reversible refrigerating apparatus, a generator, a condenser connected to said generator, an evaporator connected to said condenser, a jacket containing a liquid surrounding said generator, a cooler connected to the top and bottom of said jacket, means for heating said jacket, and means interrupting the flow of said liquid between said jacket and said cooler during said heating and permitting said flow after a period of said heating.

2. In a reversible refrigerating apparatus, a generator, a condenser connected to said generator, an evaporator connected to said condenser, a jacket containing a liquid surrounding said generator, a cooler connected to the top and bottom of said jacket, means for heating said jacket, and automatically acting means interrupting communication between the top of said jacket and said cooler during said heating and re-establishing said communication after a period of said heating.

3. In a reversible refrigerating apparatus, a generator, a condenser connected to said generator, an evaporator connected to said condenser, a jacket containing a liquid surrounding said generator, a cooler connected to the top and bottom of said jacket, means for heating said jacket, and means operated by the pressure in said cooler for interrupting communication between the top of said jacket and said cooler during said heating and re-establishing said communication after a period of said heating.

4. In a reversible refrigerating apparatus, a generator, a condenser connected to said generator, an evaporator connected to said condenser, a jacket containing a liquid surrounding said generator, a cooler connected to the top and bottom of said jacket, a valve at the connection between the top of said jacket and said cooler, means for heating said jacket, and automatically acting means for opening said valve and interrupting said heating after a period of said heating.

5. In a reversible refrigerating apparatus, a generator, a condenser connected to said generator, an evaporator connected to said condenser, a jacket containing a liquid surrounding said generator, a cooler connected to the top and bottom of said jacket, a valve at the connection between the top of said jacket and said cooler, means for heating said jacket, and means operated by the pressure in said cooler for opening said valve and interrupting said heating after a period of said heating.

6. In a reversible refrigerating apparatus, a generator, a condenser connected to said generator, an evaporator connected to said condenser, a jacket containing liquid surrounding said generator, means for heating said jacket, a second generator, a second condenser connected to said second generator, a second evaporator connected to said second condenser, a second jacket containing liquid surrounding said second generator, means for heating said second jacket, a cooler connected to the top and bottom of both said jackets, and means interrupting the flow of said liquid alternately between each of said jackets and said cooler during said heating of said jacket and permitting said flow after a period of said heating.

7. In a reversible refrigerating apparatus, a generator, a condenser connected to said generator, an evaporator connected to said condenser, a jacket containing liquid surrounding said generator, means for heating said jacket, a second generator, a second condenser connected to said second generator, a second evaporator connected to said second condenser, a second jacket containing liquid surrounding said second generator, means for heating said second jacket, a cooler connected to the top and bottom of both said jackets, and automatically acting means interrupting communication alternately between the top of each of said jackets and said cooler during said heating of said jacket and reestablishing said communication after a period of said heating.

8. In a reversible refrigerating apparatus, a generator, a condenser connected to said generator, an evaporator connected to said condenser, a jacket containing liquid surrounding said generator, means for heating said jacket, a second generator, a second condenser connected to said second generator, a second evaporator connected to said second condenser, a second jacket containing liquid surrounding said second generator, means for heating said second jacket, a cooler connected to the top and bottom of both said jackets, a valve at the connection between the top of each of said jackets and said cooler, and automatically acting means for opening each of said valves alternately and interrupting the heating of the said jacket the valve of which is opened after a period of said heating.

9. In a reversible refrigerating apparatus, a generator, a condenser connected to said generator, an evaporator connected to said condenser, a jacket containing liquid surrounding said generator, means for heating said jacket, a second generator, a second condenser connected to said second generator, a second evaporator connected to said second condenser, a second jacket containing liquid surrounding said second generator, means for heating said second jacket, a cooler connected at the top and bottom of both said jackets, a valve at the connection between the top of each of said jackets and said cooler, means operated by the pressure in said cooler for opening each of said valves alternately and interrupting the heating of the said jacket the valve of which is opened after a period of said heating.

10. In a reversible refrigerating apparatus, a generator, a condenser connected to said generator, an evaporator connected to said condenser, a jacket containing a liquid surrounding said generator, a cooler connected to the top and bottom said jacket, means for heating said jacket, and means operated by the displacement of said liquid in said jacket for interrupting communication between the top of said jacket and said cooler during said heating and re-establishing said communication after a period of said heating.

11. In a reversible refrigerating apparatus, a generator, a condenser connected to said generator, an evaporator connected to said condenser, a jacket containing a liquid surrounding said generator, a cooler connected to the top and bottom of said jacket, a valve at the connection between the top of said jacket and said cooler, means for heating said jacket, and means operated by the displacement of said liquid in said jacket for opening said valve and interrupting said heating after a period of said heating.

12. In a reversible refrigerating apparatus, a generator, a condenser connected to said generator, an evaporator connected to said condenser, a jacket containing liquid surrounding said generator, means for heating said jacket, a second generator, a second condenser connected to said second generator, a second evaporator connected to said second condenser, a second jacket containing liquid surrounding said second generator, means for heating said second jacket, a cooler connected to the top and bottom of both said jackets, a valve at the connection between the top of each of said jackets and said cooler, means operated by the displacement of said liquid in said jackets for opening each of said valves alternately and interrupting the heating of the said jacket the valve of which is opened after a period of said heating.

In testimony whereof I have signed my name to this specification.

JENS ORTEN BOVING.